ELECTRONIC IMAGE SYSTEM AND METHOD

Original Filed June 22, 1955

3 Sheets-Sheet 1

INVENTOR.
Douglas W. Taylor,
BY
Mueller & Aichele
Atty's.

INVENTOR.
Douglas W. Taylor,
BY
Mueller & Aichele
Atty's.

ELECTRONIC IMAGE SYSTEM AND METHOD

Original Filed June 22, 1955

INVENTOR.
Douglas W. Taylor
BY
Mueller & Aichele
Atty's.

United States Patent Office 2,944,174

Patented July 5, 1960

2,944,174

ELECTRONIC IMAGE SYSTEM AND METHOD

Douglas W. Taylor, Forest Grove, Oreg., assignor to Motorola, Inc., Chicago, Ill., a corporation of Illinois Continuation of abandoned application Ser. No. 517,332, June 22, 1955. This application Sept. 18, 1958, Ser. No. 762,201

13 Claims. (Cl. 313—77)

The present invention relates to electronic image systems and more particularly to apparatus and methods for magnifying a televison cathode-ray tube display so that images comparable in size to those produced by prior art sytems may be displayed with considerably less power consumption. This application is a continuation of application Serial No. 517,332 filed June 22, 1955 and now abandoned.

Television receiving systems, and the like, usually include a cathode-ray image reproducing tube in which a cathode-ray beam is developed and directed to a target area in the form of a fluorescent screen at the other end of the tube. The cathode-ray beam is intensity-modulated in accordance with a composite video signal recovered from a received television signal, and the beam is scanned by a suitable deflection means in synchronism with the received televison signal to set up an image raster on the screen. This scanning comprises a series of frames of interlaced lines; and the deflection means sets up a high frequency line or horizontal deflection field for horizontally deflecting the cathode-ray beam, and the deflection means also sets up a low frequency frame or vertical deflection field for vertically deflecting the beam. This horizontal and vertical scanning produces a two-dimensioned image on the screen of the cathode-ray reproducer.

As is well known, the vertical and horizontal deflection means of the cathode-ray image reproducer take the form of inductive coils or windings which are respectively energized by sawtooth current waves when electromagnetic deflection is used, which sawtooth waves have respectively the horizontal and vertical deflection frequency and are synchronized with the received television signal. In order to obtain a linear sweep, the intensity of these sawtooth current waves must be linearly increased and the power requirements of the horizontal and vertical deflection systems are considerable. This is particularly the case in present day systems in which intensities of the horizontal and vertical deflection fields must be sufficient to cause the cathode-ray beam to be scanned through a large deflection angle in the presence of a high accelerating voltage. The power required by the horizontal or line deflection system is much greater than that required by the vertical or frame deflection system because the line deflection is operated at a much higher frequency, and the power requirements of the deflecting systems vary essentially directly with frequency. It is usual, for example, in present day television receivers, for one-third of the total power required by the receiver to be used in the horizontal deflection system.

Attempts have been made in the past to incorporate a magnetic lens system in conjunction with the cathode-ray image reproducer of a television receiver to set up a fixed field that will magnify and enlarge the reproduced image. It was clear that great savings in power could be realized in an arrangement in which the deflection systems were called upon to deflect the cathode-ray beam over only a fraction of the screen or target area, and in which a fixed magnetic lens requiring no power magnified the image to cover the whole screen. However, theoretically, this would require a negative lens which would set up a circular magnetic field whose intensity is zero at the center, and which increases in intensity radially outwardly from the center, with equal radial points all having the same magnetic intensity. Such a field would produce equal and undistorted magnification of the reproduced image in all dimensions. However, although negative lenses are possible in optics and take the well-known physical form of a concave configuration, it is believed impossible to produce a negative magnetic lens of this type. Therefore, it has been found that any magnetic lens set up in the reproducer to have a magnifying effect on one dimension of the reproduced image, will have a contracting or compressing effect on the other dimension. It has been suggested, because of this unavoidable effect, that the horizontal dimension of the reproduced image be magnified with resulting saving in power in the horizontal or line deflecting system, and that the power in the vertical or frame sweep system be increased to compensate for the resulting decrease in the vertical dimension. This, however, has not proved to be commercially feasible because it has been found that only a small amount of horizontal magnification is possible without radically affecting the vertical dimension, so that the additional power needed in the vertical deflection system to maintain the vertical dimension offsets whatever saving may be realized in the horizontal deflection system.

It is an object of the present invention to provide in a cathode-ray tube display apparatus, a system and method capable of magnifying both dimensions of a reproduced image so that power savings may be realized in both the vertical and horizontal deflecting systems of such apparatus.

A more general object of the invention is to provide in a cathode-ray tube display apparatus, a system which effectively enables a large size image to be reproduced with relatively low power consumption as compared with prior art apparatus of this general type.

A more specific object of the invention is to provide in a television receiver a system for increasing both the horizontal and vertical dimensions of a reproduced image without requiring power, so that the power requirements of both the horizontal and vertical deflection systems of the receiver may be substantially less than prior art receivers of this general type.

A feature of the invention is the provision in a cathode-ray tube display apparatus of a magnetic lens system which establishes a fixed magnetic field in the tube between the varying deflection fields and the screen or target area thereof, which fixed field has various components having respective senses and intensities so as to magnify one dimension of the reproduced image and so as to invert and magnify the other dimension.

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 shows a television receiver constructed to incorporate the invention;

Figs. 2 and 2*a* show the magnetic field produced by the lens of the invention;

The present invention finds utility in a television receiving system which includes a cathode-ray image reproducer having means for developing a cathode-ray beam therein and means for directing such a beam to a target or screen area. The invention includes the combination of deflection means for establishing a pair of mutually perpendicular varying deflection fields in the reproducer so as to reproduce an image on the target area having a vertical dimension and a horizontal dimension, and a magnetic lens for producing a plurality of fixed magnetic fields within the reproducer between the deflection fields and the target area; the fixed fields increasing in intensity from zero at the center of the tube and having respective senses and intensities for inverting one dimension of the reproduced image and for magnifying the other dimension of the reproduced image without inversion.

Figures 1, 2, 3, 4:
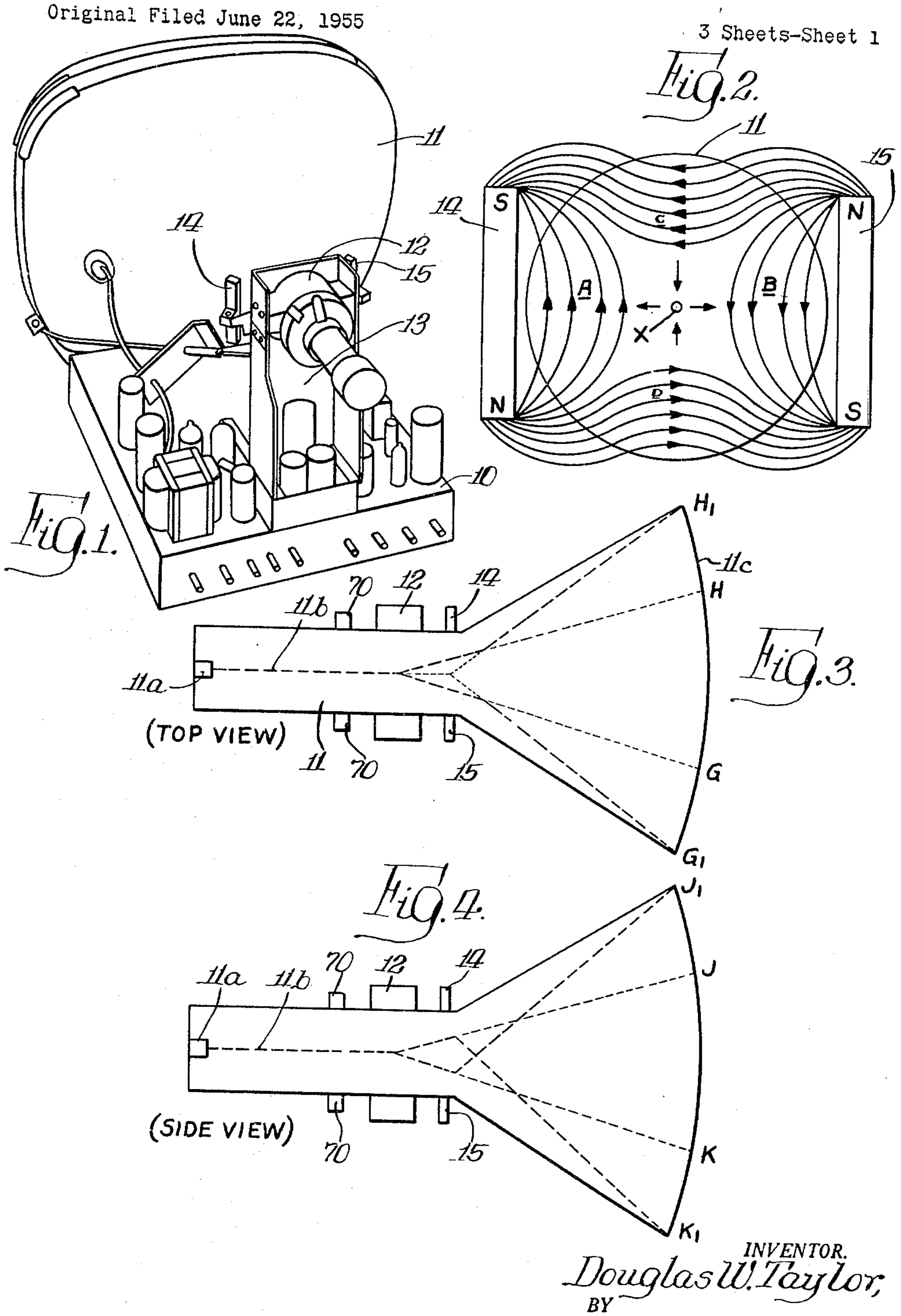
Figs. 3 and 4 are schematic representations useful in explaining the invention.

The television receiver of Fig. 1 includes a usual chassis 10 which supports a multiplicity of components necessary for the proper operation of the television receiver. The system also includes a cathode-ray image reproducer 11 of known construction. This reproducer includes an electron gun for forming a cathode-ray beam within the tube, and usual accelerating electrodes for directing the beam onto a target area in the form of the fluorescent screen of the tube. The system also includes a deflection yoke 12 which is mounted on a bracket 13, the bracket being supported on chassis 10. The deflection yoke includes the usual line and field deflection coils or windings which respond to respective sawtooth current waves for establishing the vertical and horizontal deflection fields within the tube.

Bracket 13 also supports, in accordance with one embodiment of the invention, a pair of permanent magnets 14 and 15 adjacent the portion of tube 11 between the deflection yoke 12 and the image screen. These permanent magnets set up a series of fixed or invariable magnetic fields between the horizontal and vertical deflection fields and the target area, as will be described.

The magnets may be disposed in the manner shown in Fig. 2 and they set up a fixed magnetic field having a first pair of components indicated A and B on either side of the longitudinal axis X at the center of the tube 11. The components A and B have lines of force which are essentially perpendicular to the line or horizontal deflection of the beam in the tube, and these fields have mutually opposite senses (as indicated by the arrows) such that they tend to deflect or refract the cathode-ray beam toward the edge of tube 11 so as to magnify the beam deflection. Moreover, these fields increase in intensity from zero at the center of the tube so that they may properly perform their magnification function. Therefore, as the cathode-ray beam is deflected in the horizontal direction by the line deflection field, it enters into a fixed field of increasing intensity on either side of the center of the tube as it is so deflected, so that this field tends to produce a further deflection in the horizontal direction which results in a magnification of the horizontal dimension of the reproduced image.

However, it is inescapable when the fields A and B are set up by the permanent magnet structures 14, 15, that a further pair of field components C and D are also set up. The components C and D are also fixed, and these latter components have lines of force extending essentially perpendicular to the vertical deflection of the cathode-ray beam in tube 11. These components C and D also increase in intensity with opposite senses (shown by the arrows on the lines of force) from zero at the center or longitudinal axis of the tube to a maximum at the outer edges. Unfortunately, however, the sense of the components C and D is, and must be, such that it opposes the frame or vertical deflection, so that they have a tendency to direct the cathode-ray beam inwardly (as shown by the arrows) so as to have a compressing rather than a magnifying effect on the vertical dimension of the reproduced image. Prior to the present invention, attempts were made to overcome this compressing effect by increased power in the frame or vertical deflection system, but this has not proved to be practical from a commercial standpoint, as previously pointed out. Contrary to the prior art, the present invention, instead of attempting to compensate or eliminate the effects of the field components C and D, provides that these components be of sufficient strength so as to completely invert the vertical dimension of the reproduced image and restore it to its original size (or preferably to magnify it) in the opposite direction. With such an arrangement, a high degree of horizontal magnification can be achieved, since extremely strong components A and B can be provided without the need to overcome the correspondingly relatively strong fields C and D. Instead, the latter are used to invert the reproduced image and magnify its vertical dimension. In this manner, a high degree of magnification may be effected to both the vertical and horizontal dimensions of the reproduced image without the need for increased power required in the vertical deflection system, as was the case in prior systems. Instead, the vertical power can actually be reduced, along with the horizontal power.

The effect of the fixed magnetic field on the cathode-ray beam is shown schematically in Figs. 3 and 4. Fig. 3 is a top view of the tube, looking down to see the effect of the magnetic lens on the horizontal or line scan. The device 11 includes an electron gun **11*a*, which develops a cathode-ray beam 11*b* that is directed onto the screen or target area 11*c* of the tube. The line deflection windings of deflection yoke 12 tend to scan the beam in a horizontal direction between the points "G" and "H" which, as can be seen, is a fraction only of the entire screen horizontal dimension. The permanent magnets 14 and 15**, set up the field described previously herein which produces an additional horizontal deflection to the cathode-ray beam, as shown by the heavy dashed lines, and which causes the horizontal dimension to be magnified to the points "$G_1$" and "$H_1$," at the edge of the screen.

As shown in Fig. 4, which is a side view showing the effect of the magnetic lens of the vertical scan of the cathode-ray beam, it is only necessary for the vertical deflection system to produce a fractional scan between the points "$J_1$" and "$K_1$" on the screen or target area of the reproducer. The magnetic lens 14 and 15 then reverses the vertical dimension of the reproduced image, as shown by the heavy solid lines, so as to produce a magnified inverted vertical dimension for the image between the points "J" and "K."

Figures 2A, 5, 6, 7, 8, 9:
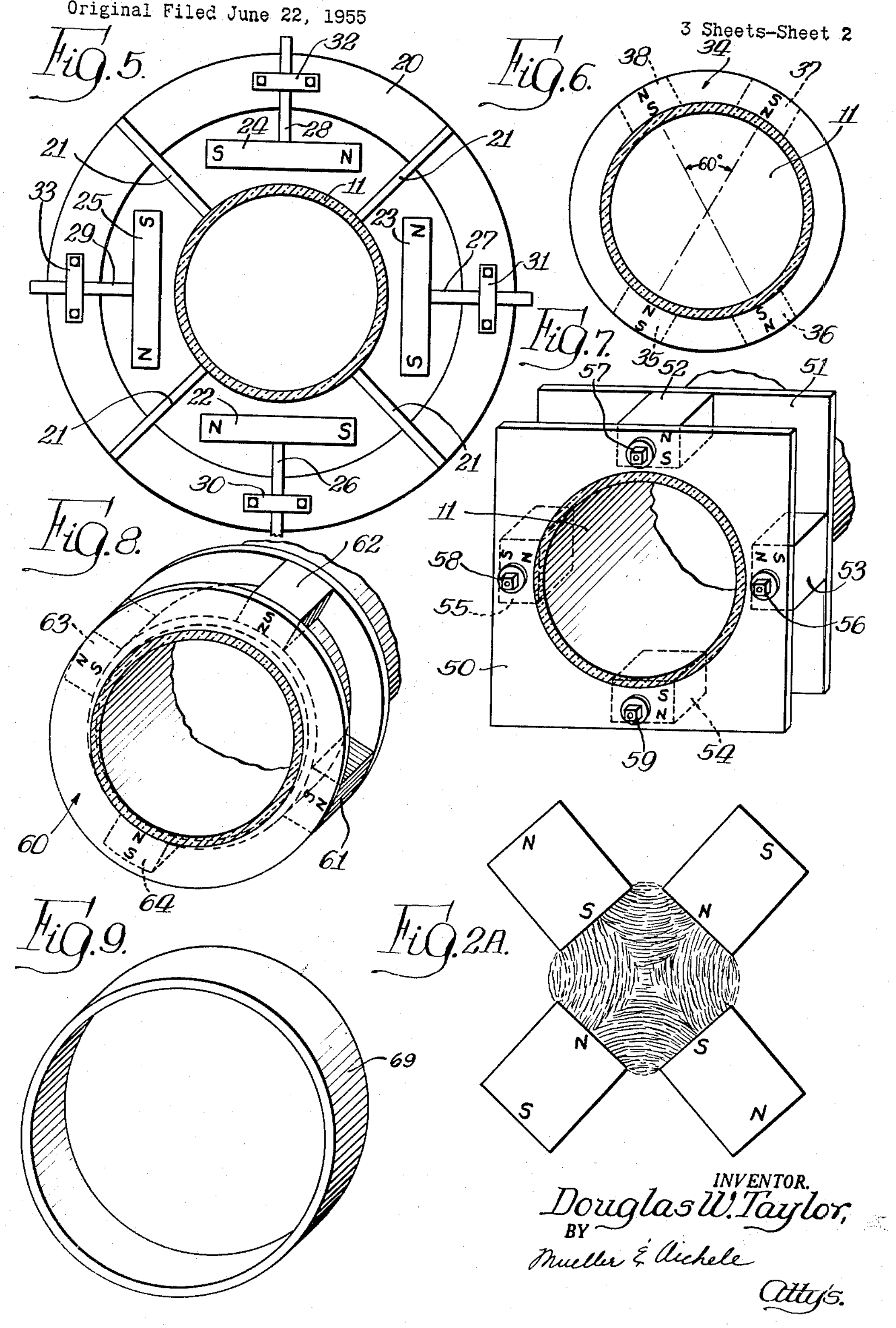
Figs. 5–8 show various structural embodiments of a magnetic lens for carrying out the invention.
Fig. 9 is a magnetic ring that may be incorporated into the assemblies of Figs. 6–8.

One structural embodiment of the magnetic lens used in the present invention is shown in Fig. 5. This arrangement includes an annular member 20 composed of a suitable non-magnetic material such as brass, ceramic or the like. Member 20 has a series of radial vanes 21 (also composed of non-magnetic material) extending inwardly therefrom so that it may be supported on the neck of tube 11 coaxial therewith. A series of four permanent magnets 22, 23, 24 and 25, longitudinally magnetized with the designated polarity, are supported on annular member 20 to be mutually displaced 90° around the neck of tube 11. The support of the magnets on member 20 is by way of a corresponding series of studs 26, 27, 28 and 29 affixed to respective ones of the magnets and extending at right angles thereto. The studs are respectively supported by clamps 30, 31, 32 and 33 secured to member 20, and which enables the magnets to be individually rotated or moved radially for adjustment purposes.

In Fig. 6, the structure takes the form of a solid annular ring 34 designed to engage tightly the neck 11 of the reproducer. Ring 34 may be composed of a mixture of iron oxide ($Fe_3O_4$) and barium oxide, fired with a ceramic. Such material is presently being marketed by Stackpole, Inc., under the designation "Ceramagnet." This material may be permanently magnetized in a radial direction in each of four segments, 35, 36, 37 and 38 having the illustrated polarity. It has been found that an optimum configuration of the fixed magnetic field may be obtained when segments 37 and 38 and segments 35 and 36 are separated angularly of the order of 60°, while poles 36 and 37 and poles 35 and 38 are separated by 120°.

In Fig. 7, the structure includes a pair of plates 50, 51 of non-magnetic material; each with a central aperture to receive the neck of the cathode-ray tube 11 and disposed in spaced parallel relation on the neck. The plates support a series of radially magnetized permanent magnets 52, 53, 54 and 55 therebetween, each exhibiting the designated pole to the tube neck and adapted tightly to engage the neck. The magnets are secured by a corresponding series of bolts 56, 57, 58 and 59 extending through enlarged holes in the plates and through respective ones of the magnets. The bolts are secured by suitable nuts and washers, and rotational and radial adjustment of the magnets is possible by virtue of the enlarged holes in the plates. It is desirable that the magnets 52–55 be adjusted to positions around the neck of tube 11 corresponding to the segments 35–38 of Fig. 6 for optimum configuration of the fixed magnetic field produced thereby.

In Fig. 8, a spool 60 of plastic or other non-magnetic material is used with four radially magnetized permanent magnets 61, 62, 63 and 64 frictionally held by the spool around the neck of tube 11. These magnets are positioned like the magnets of Fig. 7 and exhibit poles to the neck of tube 11 in the illustrated manner. When desired, the magnets 61–64 can be surrounded by a ring 69 of ferrous or other magnetizable material (Fig. 9), which cuts down stray magnetic fields and their adverse effects. Such a ring may be mounted to be axially adjustable to provide a manual control for the field strength of the lens.

It may be seen that each of the structures of Figs. 5–8 gives a field such as shown in Fig. 2A, and whose configuration is adjustable to give the best results. As previously noted, it has been found that the best configuration results when the permanent magnet poles are angularly displaced 30° on either side of the vertical axis through the center of the tube. The lenses of the invention all move the effective centers of deflection forward so that the effects of neck shadow are overcome. Also, longitudinal adjustment of the deflection yoke controls the amount of magnification of the lens, so that a covenient size control may be had by providing a suitable mechanical control for adjusting the deflection yoke along the neck of the tube.

In a constructed embodiment of the invention, a commercial raster of 21" has been obtained with the horizontal power consumption 4% and the vertical power consumption 25% of other receivers of this general type.

Figure 10:
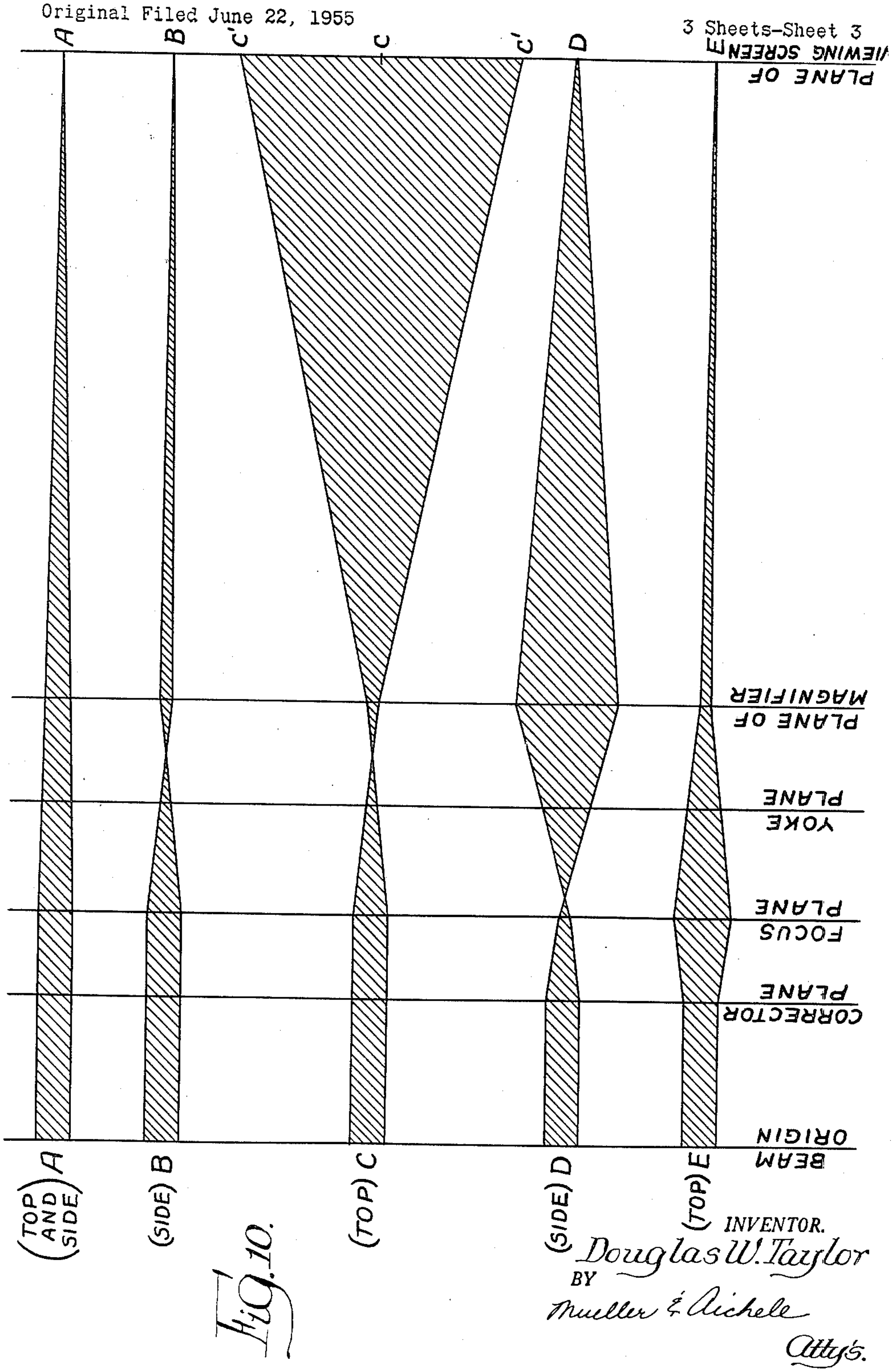
Fig. 10 is a series of diagrams useful in explaining the operation of a correcting lens.

Under some conditions the use of the sweep magnifier lens described herein may introduce some distortion in the focus of the cathode-ray beam. Neglecting for the moment the effect of the magnifier lens, and as shown in Fig. 10, view A, the usual focus lens in the reproducer 11 of Figs. 1 and 2 cause the cathode-ray beam to be brought to a point focus in the plane of the viewing screen. Now, the action of the magnifier lens is such that when the usual focus lens is controlled to bring the beam into focus at the plane of the viewing screen as viewed from the side (Fig. 10B), the divergence produced by the magnifier in the horizontal direction produces an elongation in the beam width which is not compensated by the focus lens (Fig. 10C). In other words, the magnifier lens can produce a defocussing effect on the cathode-ray beam that is different in the horizontal direction from that in the vertical direction, so that the defocussing effect cannot be completely cured by the usual symmetrical focus lens of the reproducer, although a good compromise can be made.

Full asymmetrical focus control can be achieved by providing a corrector lens 70 (Figs. 3 and 4) which is mounted on the neck of the reproducer immediately behind the usual focus lens thereof. The corrector lens consists of a four-pole permanent magnet assembly providing a flux distribution essentially identical to that of the magnifier lens. The orientation of poles in the corrector lens may also be the same as in the magnifier lens, although the field strength of the corrector is only a fraction of that required in the magnifier.

Fig. 10D is a view from the side with the corrector lens in place and properly adjusted. The corrector lens produces a converging effect on the beam which is sufficient, in conjunction with the converging effect of the usual focus lens and the magnefier lens, to bring the beam into focus vertically at the plane of the viewing screen. The corrector lens, however, produces a diverging effect on the beam, looking down as shown in Fig. 10E, which in conjunction with the converging effect of the normal focus lens and the diverging effect of the magnifier brings the beam into focus horizontally at the plane of the viewing screen. That is, the corrector is an asymmetrical lens that brings the beam into a point focus at the plane of the viewing screen.

The invention provides, therefore, a simple, practical and useful system for magnifying the image reproduced by a television receiver, which enables large size images to be reproduced by only a fraction of the power required in prior art television receivers, and which system may include a simple compensating means for correcting any defocussing that may result to the electron beam due to such image magnification.

I claim:

1. In a television receiving system which includes a cathode-ray image reproducer having means for developing a cathode-ray beam therein and means for directing such a beam to a target area, the combination of deflection means for establishing a pair of mutually perpendicular varying deflection fields in the reproducer to scan the beam in a vertical direction and in a horizontal direction thereby to reproduce an image on the target area having a vertical dimension and a horizontal dimension, with the image as produced by said deflection means alone being inverted in the vertical direction, and a magnetic lens including magnet means for producing a plurality of fixed fields within the reproducer between the deflection fields and the target area, said fixed fields increasing in intensity from zero at the center of the tube, said magnet means having poles of polarities and strengths such that said fields have a sense and magnitude to invert and magnify the vertical dimension of the reproduced image and to magnify the horizontal dimension of the reproduced image in its original direction.

2. In a television receiving system which includes a cathode-ray image reproducer having means for developing a cathode-ray beam therein and means for directing such a beam to a target area, the combination of deflection means for establishing a pair of mutually perpendicular line and frame varying deflection fields in the reproducer to reproduce an image on the target area having a first dimension and a second dimension at right angles to said first dimension, and with the image being inverted in said second dimension by said deflection means; and magnetic field producing means developing a first pair of fixed magnetic fields between the deflection fields and target area increasing in intensity from zero at the longitudinal axis of the tube, said magnetic means having poles of polarities such that said fixed magnetic fields of said first pair each has a sense to magnify said first dimension of the reproduced image in its original direction, said magnetic field producing means developing a second pair of fixed magnetic fields between the deflection fields and the target area at right angles to said fields of said first pair and increasing in intensity from zero at the longitudinal axis of the tube, said magnetic means having poles of polarities and strengths such that said fixed magnetic fields of said second pair each has a sense and an intensity to invert said second dimension of the reproduced image.

3. In a television receiving system which includes a cathode-ray image reproducer having means for developing a cathode-ray beam therein and means for directing such a beam to a target area, the combination of deflection means for establishing a pair of mutually perpendicular varying line and frame deflection fields in the reproducer to reproduce an image on the target area having a horizontal dimension and a vertical dimension, first permanent magnet means for developing a first fixed magnetic field between the deflection fields and the target area, second permanent magnet means for developing a second fixed magnetic field between the deflection fields and the target area, with said first and second fields increasing in intensity in opposite directions from zero at the longitudinal axis of the tube, said permanent magnet means having polarities such that said first and second fields each has a sense to magnify the horizontal dimension of the reproduced image, and said first and second permanent magnet means cooperating to develop a further pair of fixed magnetic fields between the deflection fields and the target area increasing in intensity in opposite directions from zero at the longitudinal axis of the tube, said permanent magnet means having polarities and strengths such that said second pair of fields each has a sense and an intensity to invert and magnify the vertical dimension of the reproduced image.

4. In a display system which includes a cathode-ray image reproducer having means for developing a cathode-ray beam and for directing the same toward a target area, the combination including, deflection means for establishing a pair of mutually perpendicular varying deflection fields in the reproducer which deflect the beam to scan the target area in a first direction and in a second direction perpendicular to said first direction, with the image produced by the deflection means alone being inverted in said first direction, and a magnifier lens for producing a plurality of fixed fields within the reproducer between the deflection fields and the target area, said fixed fields increasing in intensity outwardly from the central position of the beam and having a sense and magnitude to invert the reproduced image in said first direction and to magnify the reproduced image in said second direction.

5. In a display system which includes a cathode-ray tube having means for developing a cathode-ray beam therein and means for directing such beam to a target area, the combination of deflecting means for establishing a pair of varying deflection fields perpendicular to one another within the tube to scan the cathode-ray beam therein in a first direction and in a second direction perpendicular to the first direction thereby to produce an image on the target area of the tube having a first dimension and a second dimension, a magnifier lens for producing a plurality of fixed fields within the tube between the deflection fields and the target area having a sense and magnitude for producing a diverging effect in said first direction and a converging effect in said second direction, and an asymmetrical correcting lens for producing a plurality of fixed fields within the tube between the cathode-ray beam developing means and the deflecting means having a sense and magnitude such that the beam is shaped prior to deflection to provide a point focus in the plane of the target area.

6. In a display system which includes a cathode-ray tube having means for developing a cathode-ray beam therein and means for directing such beam to a target area, the combination of deflecting means for establishing a pair of varying deflection fields perpendicular to one another within the tube to scan the cathode-ray beam therein in a first direction and in a second direction perpendicular to the first direction thereby to produce an image on the target area of the tube having a first dimension and a second dimension, a permanent magnet magnifier lens for producing a plurality of fixed fields within the tube between the deflection fields and the target area for producing a diverging effect in said first direction to magnify said first dimension of the reproduced image and for producing a converging effect in said second direction to invert said second dimension of the image, and a permanent magnet asymmetrical correcting lens for producing a plurality of fixed fields within the tube between the cathode-ray beam developing means and the deflecting means to diverge the beam in said first direction and to converge the beam in said second direction thereby to bring the beam to a point focus in the plane of said target area.

7. In a display system including in combination a cathode-ray tube having a vertical target and a gun directing a beam toward the center of said target, deflection means for deflecting the beam horizontally at a high frequency and vertically at a low frequency to form a frame having one dimension vertically and substantially smaller dimension horizontally, four magnets, and means mounting the magnets radially of the center axis of the tube in positions in which poles thereof form corners of a rectangle having upper corners and lower corners directly below the upper corners, said mounting means holding said magnets in positions in which the south poles thereof are at two diagonally opposite corners of the rectangle and the north poles thereof are at the other two diagonally opposite corners of the rectangle, said mounting means so holding said magnets that said magnets are closer horizontally than vertically, said magnets having strengths such that magnetic fields are produced thereby which invert and magnify the vertical dimension of said frame and which magnify the horizontal dimension of said frame in its original direction.

8. In a display system including in combination a cathode-ray tube provided with a target area and a gun for directing a beam toward the center of said target area, deflection means located between said gun and said target area for scanning the beam to create a rectangular frame on the target area having vertical and horizontal dimensions, a spool of non-magnetic material fitting on the neck of said tube between said target area and said deflection means, a plurality of bar magnets held between the flanges of said spool in positions forming a magnifying lens for said tube, and an outer band of magnetic material surrounding the spool for cutting down stray magnetic effects, said magnets having strengths and polarities such that magnetic fields are produced between said deflection means and said target area which invert and magnify the vertical dimension of said rectangular frame, and which magnify the horizontal dimension of said rectangular frame in its orignal direction.

9. In a display system, the combination of a cathode-ray tube having a screen and an electron beam source for directing a beam toward the center of the screen, signal-actuated deflection means providing a deflection field located between said screen and said source which has a distribution to deflect the beam bidirectionally, magnifying means providing a magnifying field in the path of the beam and located between said deflection field and said screen which has a distribution to magnify the deflection of the beam bidirectionally, and correcting means providing a field in the path of the beam and located between said source and said deflection field for correcting defocussing effects resulting from said magnifying field.

10. A method for displaying an image on the screen of a cathode-ray tube which comprises, producing a pair of mutually perpendicular deflection fields within the tube to scan a cathode-ray beam therein and produce an image on the screen of the tube having a first dimension and having a second dimension, producing a first pair of fixed magnetic fields within the tube each increasing in intensity from zero at the center thereof and each of a sense and magnitude to invert the produced image in said first dimension, and producing a second pair of fixed magnetic fields within the tube each increasing in intensity from zero at the center thereof and each of a sense and magnitude to magnify the image in said second dimension.

11. The method of displaying an image on the screen of a cathode-ray tube which includes the steps of, directing a cathode-ray beam toward the screen, producing a pair of mutually perpendicular deflection fields within the tube along the path of the cathode-ray beam to deflect the beam in first and second mutually perpendicular directions, producing a first fixed field within the tube increasing in intensity outwardly from the central position of the beam and of a sense and magnitude to invert and magnify the image in said first direction, and producing a second fixed field within the tube increasing in intensity outwardly from the central position of the beam and of a sense and magnitude to magnify the image in said second direction.

12. The method of displaying an image on the screen of a cathode-ray tube which includes the steps of, producing a cathode-ray beam and directing the same toward the screen, producing a pair of mutually perpendicular deflection fields within the tube along the path of the cathode-ray beam to deflect the beam in a first direction and in a second direction substantially perpendicular to said first direction, producing fixed magnifier fields within the tube between the deflecting fields and the screen which increase in intensity outwardly from the central position of the beam and of a sense and magnitude to invert the image in said first direction and to magnify the image in said second direction, and producing fixed correcting fields within the tube between the cathode-ray beam source and the deflecting fields to shape the beam so that the beam striking the screen has a substantially uniform cross section.

13. The method of displaying an image on the screen of a cathode ray tube which includes an electron beam source for directing a beam toward the screen, which method includes the steps of, providing a deflection field between the electron beam source and the screen for deflecting the beam bidirectionally, providing a magnifying field in the path of the beam between said deflection field and the screen which has a distribution to magnify the deflection of the beam bidirectionally, and providing a correcting field in the path of the beam between the beam source and said deflection field for correcting defocussing effects resulting from said magnifying field.

References Cited in the file of this patent

UNITED STATES PATENTS

| | | |
|---|---|---|
| 2,157,182 | Maloff | May 9, 1939 |
| 2,177,688 | Cawein | Oct. 31, 1939 |
| 2,498,354 | Bocciarelli | Feb. 21, 1950 |

FOREIGN PATENTS

| | | |
|---|---|---|
| 726,721 | Great Britain | Mar. 23, 1935 |